(12) United States Patent
Cole et al.

(10) Patent No.: US 9,413,989 B2
(45) Date of Patent: Aug. 9, 2016

(54) DUAL BAND IMAGER

(71) Applicant: Honeywell International Inc., Morristown, NJ (US)

(72) Inventors: Barrett E. Cole, Bloomington, MN (US); Bernard S. Fritz, Eagan, MN (US)

(73) Assignee: Honeywell International Inc., Morris Plains, NJ (US)

(*) Notice: Subject to any disclaimer, the term of this patent is extended or adjusted under 35 U.S.C. 154(b) by 580 days.

(21) Appl. No.: 13/895,157

(22) Filed: May 15, 2013

(65) Prior Publication Data

US 2014/0022393 A1    Jan. 23, 2014

Related U.S. Application Data

(60) Provisional application No. 61/647,313, filed on May 15, 2012.

(51) Int. Cl.
| | | |
|---|---|---|
| *G02F 1/01* | (2006.01) | |
| *H04N 5/33* | (2006.01) | |
| *H04N 5/225* | (2006.01) | |

(52) U.S. Cl.
CPC .............. *H04N 5/33* (2013.01); *H04N 5/2254* (2013.01)

(58) Field of Classification Search
CPC ................ G02B 2027/0138; G02B 27/017; H04N 5/2254; H04N 5/33
USPC ........................................................ 250/330
See application file for complete search history.

(56) References Cited

U.S. PATENT DOCUMENTS

| | | | | |
|---|---|---|---|---|
| 3,365,577 A | * | 1/1968 | Teeg ...................... | G02B 23/12 250/214 VT |
| 4,723,077 A | * | 2/1988 | Wu ......................... | G02F 1/135 250/252.1 |
| 6,140,980 A | * | 10/2000 | Spitzer ................... | A61B 3/113 257/E21.614 |
| 6,670,599 B2 | | 12/2003 | Wagner et al. | |
| 6,879,014 B2 | | 4/2005 | Wagner et al. | |
| 6,985,281 B2 | | 1/2006 | Wagner et al. | |
| 7,002,697 B2 | | 2/2006 | Domash et al. | |
| 7,049,004 B2 | | 5/2006 | Domash et al. | |
| 7,304,799 B2 | | 12/2007 | Ma et al. | |
| 7,402,803 B1 | | 7/2008 | Wagner et al. | |
| 7,491,060 B1 | | 2/2009 | Ma | |
| 7,522,328 B2 | | 4/2009 | Wagner et al. | |
| 7,697,192 B2 | | 4/2010 | Wagner et al. | |
| 7,829,854 B2 | | 11/2010 | Wagner et al. | |

(Continued)

OTHER PUBLICATIONS

"The New Light in Spectroscopy". Redshift. OpTIC Optical Thermal Imaging Cameras. Date accessed: Apr. 7, 2014 from htip://reshiftsystems.com/site/TechnologyProducts/Products/tabid/73/Defaulth.aspx.

*Primary Examiner* — David J Makiya
*Assistant Examiner* — Taeho Jo
(74) *Attorney, Agent, or Firm* — Brooks, Cameron & Huebsch, PLLC

(57) ABSTRACT

A dual band imager includes a lens to receive short wavelength and medium or long wavelength radiation from a scene to be imaged, a beam splitter positioned to receive the radiation from the lens, a medium or long wavelength to short wavelength image converter positioned to receive long wavelength radiation reflected via the beam splitter and to transmit the image information via short wavelength radiation, and a detector to receive the short wavelength radiation containing the image information through the beam splitter or from the scene and from the image converter.

18 Claims, 14 Drawing Sheets

(56) References Cited

U.S. PATENT DOCUMENTS

| | | | |
|---|---|---|---|
| 8,018,647 B2 * | 9/2011 | Rice | G01J 3/32 250/330 |
| 8,387,883 B1 | 3/2013 | Marcus et al. | |
| 8,559,016 B2 * | 10/2013 | Nebosis | G01N 21/4795 356/497 |
| 2006/0176580 A1 * | 8/2006 | Kirkham | G02B 13/16 359/738 |
| 2006/0262514 A1 * | 11/2006 | Conner | G02B 27/283 362/19 |
| 2007/0273770 A1 * | 11/2007 | Manassen | B82Y 20/00 348/222.1 |
| 2008/0037129 A1 * | 2/2008 | Hodgson | G02B 5/285 359/588 |
| 2010/0134628 A1 * | 6/2010 | Pfitzner | B23K 26/03 348/159 |
| 2010/0142355 A1 * | 6/2010 | Katayama | G02B 5/1871 369/112.04 |
| 2010/0149543 A1 * | 6/2010 | Nebosis | G01N 21/4795 356/450 |
| 2011/0051229 A1 * | 3/2011 | Alexay | G02B 13/146 359/356 |
| 2011/0242791 A1 * | 10/2011 | Chen | G03B 21/14 362/84 |
| 2011/0249436 A1 * | 10/2011 | Li | F21V 9/16 362/235 |
| 2011/0279680 A1 * | 11/2011 | Cole | H04N 5/33 348/164 |
| 2012/0007839 A1 * | 1/2012 | Tsao | A61B 19/00 345/204 |
| 2012/0162750 A1 * | 6/2012 | Vizgaitis | G02B 13/146 359/351 |
| 2012/0168513 A1 | 7/2012 | Fritz et al. | |
| 2012/0317739 A1 | 12/2012 | Rapp | |
| 2013/0009062 A1 | 1/2013 | Cole | |
| 2013/0048733 A1 | 2/2013 | Marcus et al. | |
| 2013/0048844 A1 | 2/2013 | Marcus et al. | |
| 2013/0329276 A1 | 12/2013 | Nakayama et al. | |
| 2014/0347860 A1 * | 11/2014 | Yang | F21V 9/16 362/293 |

* cited by examiner

DUAL BAND IMAGER

RELATED APPLICATION

This application claims priority to U.S. Provisional Application Ser. No. 61/647,313 (entitled Dual Band Infrared Imager, filed May 15, 2012) which is incorporated herein by reference.

BACKGROUND

Imagers for imaging radiation are usually designed to detect short wavelength or long wavelength radiation. In cases where the same imager is used for both wavelengths, separate detectors may be utilized to detect the different bands of radiation. The use of separate detectors can lead to difficulties in registering images from the different detectors with each other.

DETAILED DESCRIPTION

Figure 1:
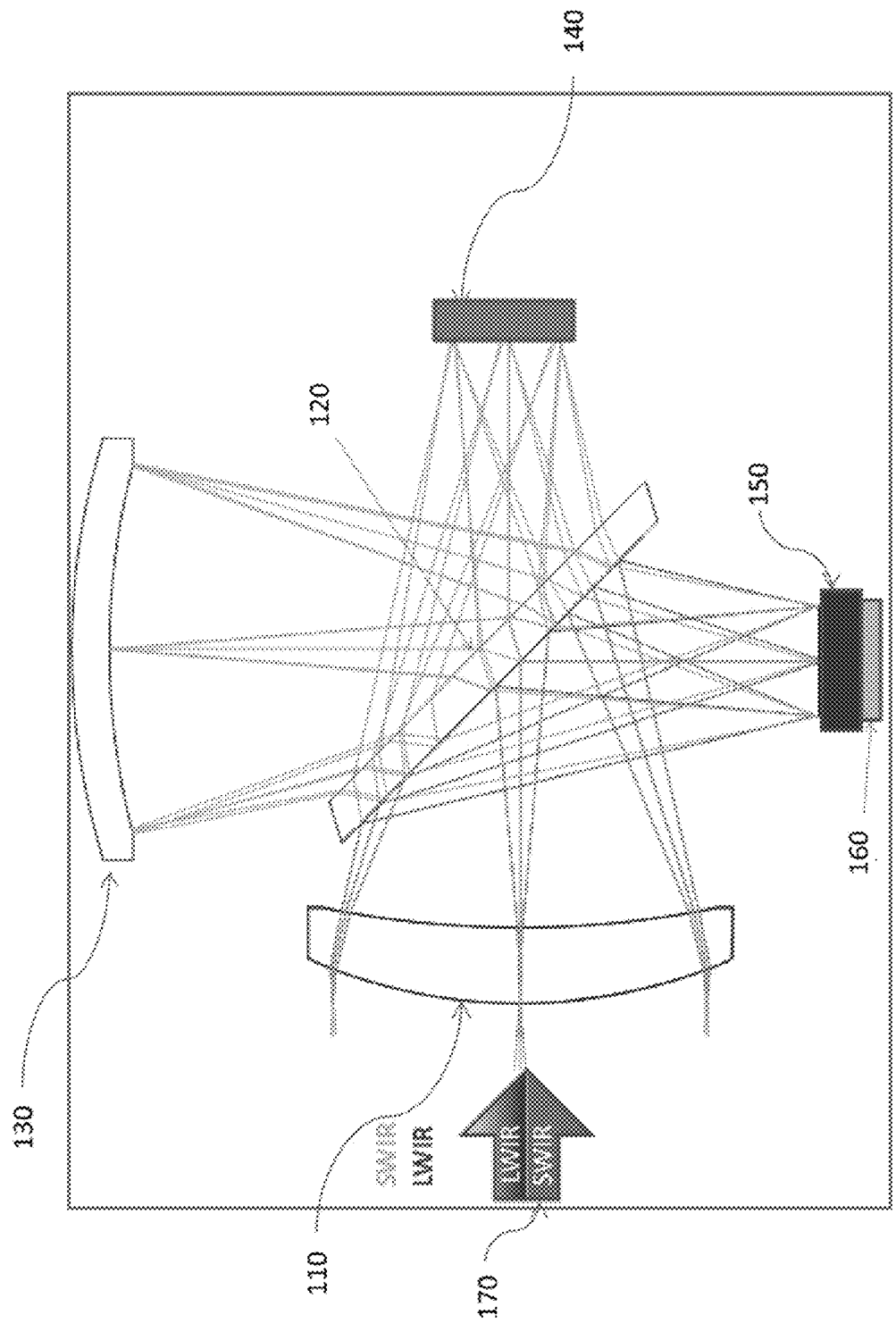
FIG. 1 illustrates an optical tracing path of an embodiment of the present disclosure.

A dual band imager constructed according to the present disclosure includes a lens to receive short wavelength and long wavelength radiation from a scene to be imaged. A beam splitter is positioned to receive the radiation from the lens. A long wavelength to short wavelength image converter is positioned to receive long wavelength radiation reflected from the beam splitter.

To detect a long wavelength image, narrow band short wavelength radiation (e.g., light) from a light emitting diode (LED) is sent through an opto-thermally sensitive portion of an image converter element via the beam splitter and power mirrors and beam splitter and onto the SW detector element. A SW detector such as indium gallium arsenide (InGaAs) is positioned to receive wavelength radiation through the beam splitter from the scene and also from the image converter in alternating frames. As discussed herein, various embodiments may include polarizers, filters, and other components.

In a further embodiment, a method includes receiving short wavelength radiation, projecting the short wavelength radiation onto a short wavelength radiation detector to provide an image based on the received short wavelength radiation, receiving long wavelength radiation, projecting the long wavelength radiation onto an image converter, converting the received long wavelength radiation into converted short wavelength radiation, and projecting the converted short wavelength radiation onto the short wavelength radiation detector to provide an image based on the received long wavelength radiation.

In some embodiments, a short wavelength infrared-long wavelength infrared (SWIR-LWIR) imager can be utilized. For example, a dual band SWIR-LWIR imager has many benefits over a single band LWIR bolometric imager. For instance, the dual band imager can utilize a SWIR detector array as the readout approach for LWIR sensing and thus can be ideally suited to, in some instances, also provide direct SWIR imaging without major changes.

Embodiments herein combine a short wavelength+long wavelength (SW+LW) IR imager that may provide simpler design and/or lower costs than current dual-band technologies. The dual band imager embodiments are described, followed by a description of a dual band imaging and timing scheme for a dual mode imager that utilizes the dual band imager.

While imager embodiments are described with respect to infrared radiation, it may be adapted to consider many different bands of radiation, including the visible spectrum and shorter wavelengths as well, the use of the terms "short" and "long" simply refer to the relative wavelengths of bands to be imaged. Some other bands might include medium wavelength infrared radiation and long wavelength infrared radiation, for example. Still further embodiments might image dual bands including long wavelength radiation and mid wavelength radiation utilizing different materials. Infrared radiation is also well characterized by the terms "short", "medium", and "long" wavelength by those skilled in the art.

A potential use case is the employment of the long wavelength infrared (LWIR) sensing for a passive wide field-of-view (WFOV) in target acquisition. Upon acquisition of a potential target, an operator can actively illuminate and employ the short wavelength infrared (SWIR) sensing in a narrow field-of-view (NFOV) for target identification and verification. Potential platforms for this system include heavy crew served weapons and/or individual precision weapons systems, for example. Although some of the discussion below is focused on IR radiation, it should be understood from the above discussion that these concepts may be utilized with non-IR radiation and, therefore, a claim should not be viewed as being limited to IR radiation unless IR is specifically included in that particular claim.

In various embodiments, LWIR scene radiation is imaged onto a thermally sensitive pixelated array, somewhat like a microbolometer. A dual band imager embodiment of the present disclosure is different from a bolometer in that the sensing mechanism is not a thermally induced resistance change in the VOx bolometer pixel resistor caused by the absorption of LWIR radiation.

For a dual band imager, the image information is detected by an optical readout (e.g., 1.5 um wavelength optical readout). For example, a VO2 dual band imager pixel, when heated by LWIR radiation, undergoes a loss in transmission for SWIR radiation. When the LED backlight is projected through the VO2 pixels and onto an InGaAs detector, the InGaAs signal measures the individual temperature changes of each VO2-based pixel caused by the absorption of the LWIR radiation. It should be understood that other detectors may be used in the various embodiments of the present disclosure.

In some embodiments, it is desired that the detector have a significant range of sensitivity to detect lower intensity SWIR radiation directly from a scene as well as higher intensity radiation from the LED backlight. Since the dual band imager was using SWIR radiation to obtain LWIR information, it could also directly collect SWIR scene radiation and achieve dual band performance. This is the basis of the dual band imagers shown in the embodiments in FIGS. 1 and 2.

In the following description, reference is made to the accompanying drawings that form a part hereof, and in which is shown by way of illustration specific embodiments which may be practiced. These embodiments are described in sufficient detail to enable those skilled in the art to practice the embodiments of the present disclosure, and it is to be understood that other embodiments may be utilized and that structural, logical, and electrical changes may be made without departing from the scope of the present disclosure. The following description of example embodiments is, therefore, not to be taken in a limited sense, and the scope of the present disclosure is defined by the appended claims.

As used herein, "a" or "a number of" something can refer to one or more such things. For example, "a number of radio devices" can refer to one or more radio devices. Additionally, the designator "N" and "P" as used herein, particularly with respect to reference numerals in the drawings, indicate that a number of the particular feature so designated can be included with a number of embodiments of the present disclosure.

FIG. 1 illustrates an optical tracing path of an embodiment of the present disclosure. In FIG. 1, the system includes a lens 110 (e.g., chalcogenide lens) for receiving radiation 170 from the scene to be imaged. The system also includes a beam splitter 120 for directing radiation to and/or from the various components (e.g., 110, 130, 140, and 150) of the system.

The system also includes a reflector 130 that receives radiation from the beam splitter 120 and directs radiation back at the beam splitter. A detector 140 is provided in the system for sensing radiation within the system.

The system also includes a medium or long wavelength to short wavelength image converter. The medium or long wavelength to short wavelength image converter is positioned to receive medium or long wavelength radiation reflected via the beam splitter and to transmit the image information via short wavelength radiation.

The system can also include a backlight 160 positioned to direct light toward the beam splitter through the image converter. In some embodiments, the system includes a controller that controls the backlight 160 to turn on the backlight 160 to cause detection of long wavelength radiation and to turn off the backlight 160 to cause detection of short wavelength radiation. This can be accomplished via circuitry in combination with firmware or hardware, for example.

Figure 2:
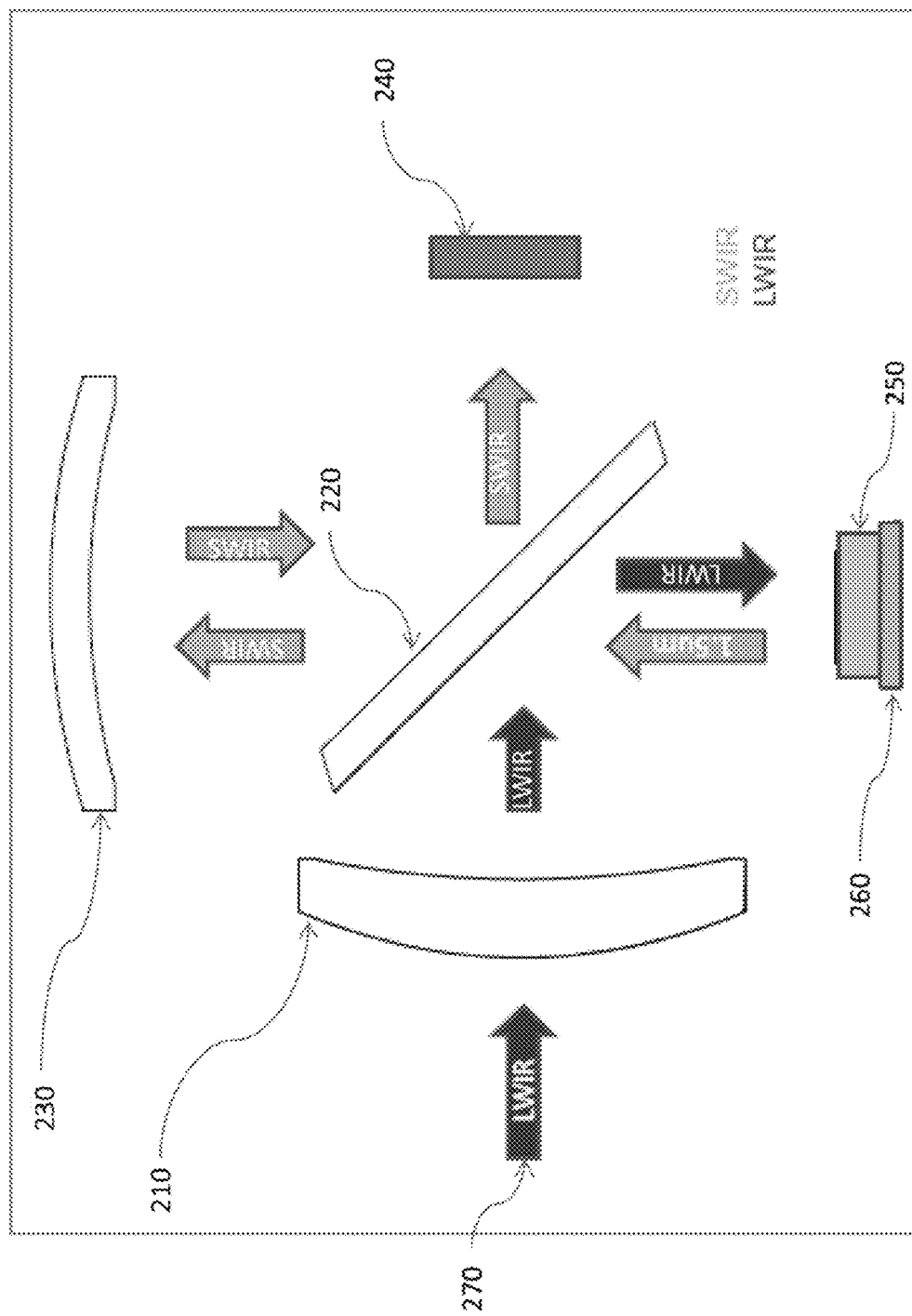
FIG. 2 illustrates the propagation of long wavelength and short wavelength light through an embodiment of the present disclosure.

FIG. 2 illustrates the propagation of long wavelength and short wavelength light through an embodiment of the present disclosure. The figures herein follow a numbering convention in which the first digit or digits correspond to the drawing figure number and the remaining digits identify an element or component in the drawing. Similar elements or components between different figures may be identified by the use of similar digits. So, for example, 130 references element "30" in FIG. 1, and a similar element may be referenced as 230 in FIG. 2.

Accordingly, the elements of FIG. 1 and FIG. 2 are the same elements. In FIG. 2, arrows are utilized to illustrate the propogation of short wavelength (e.g., SWIR in FIG. 2) and long wavelength radiation (e.g., LWIR in FIG. 2).

In the embodiment of FIG. 2, the long wavelength radiation 270 enters the system via the lens 210 and is directed by the beam splitter 220 toward the image converter 250. The image converter converts the long wavelength radiation to short wavelength radiation and the short wavelength radiation is directed toward the beam splitter. The short wavelength radiation passes through the beam splitter and toward reflector 230. The reflector propagates the short wavelength radiation back toward the beam splitter 220 which directs the radiation toward the detector 240. An example embodiment configured according to the system shown in FIGS. 1 and 2 includes a LWIR-SWIR dual band imager system having a dual band imager array with a 1.5 um LED backlight 260 that images the opto-thermal VO2 transmission changes of each pixel onto an InGaAs array and the straight through SWIR scene radiation that falls directly on the InGaAs detector.

Figure 3:
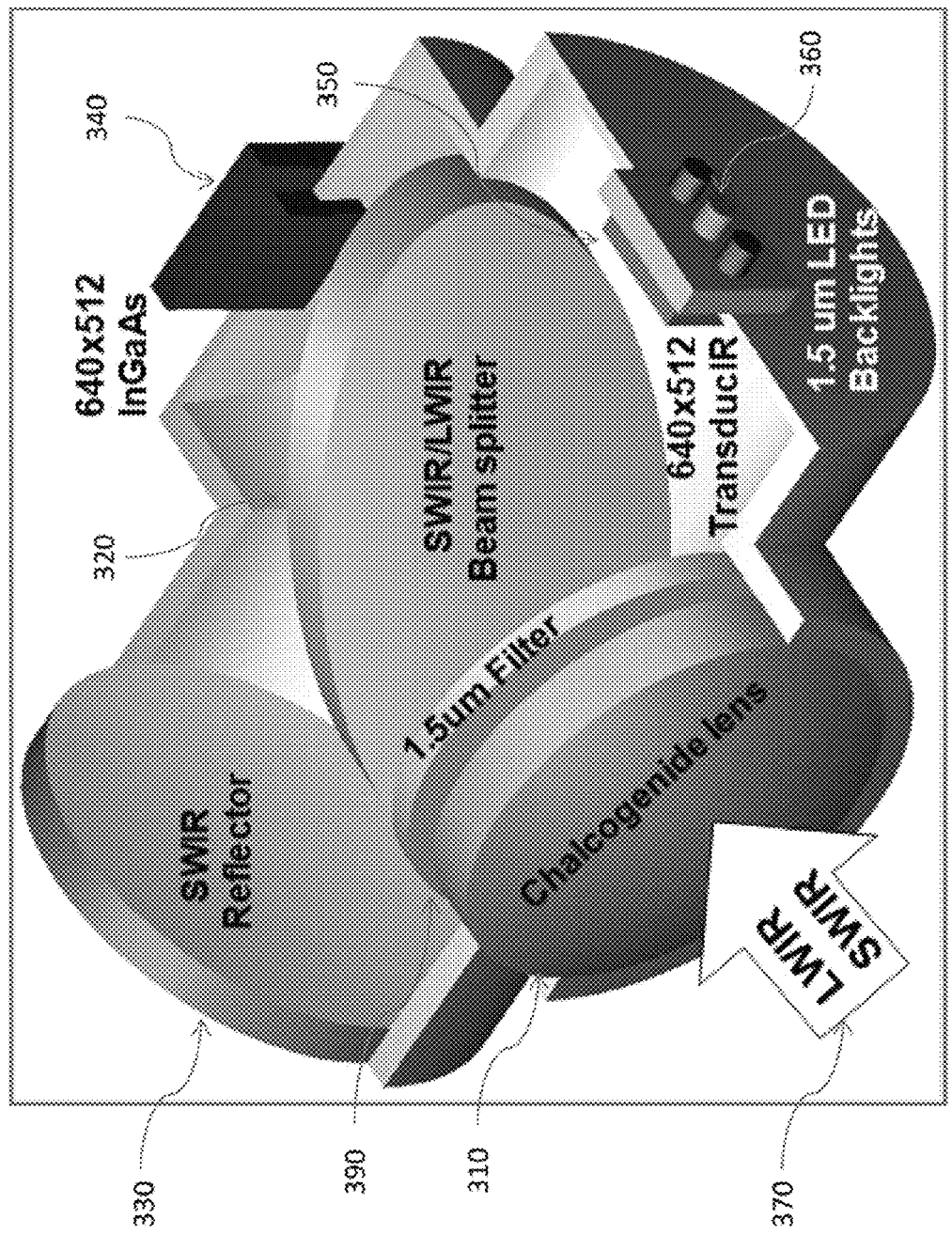
FIG. 3 illustrates a cutaway view of a dual band imager system embodiment of the present disclosure.

FIG. 3 illustrates a cutaway view of a dual band imager system embodiment of the present disclosure. The embodiment of FIG. 3 includes similar components to that of FIGS. 1 and 2 (i.e., lens 310 receiving radiation 370, a beam splitter 320, reflector 330, a detector 340, an image converter 350, and backlight 360).

However, in the example embodiment illustrated in FIG. 3, the lens 310 receives long wavelength and short wavelength radiation (e.g., LWIR and SWIR) and the beam splitter 320 separates the incoming long wavelength and short wavelength radiation with the long wavelength radiation being directed toward the image converter and the short wavelength radiation either passing through the beam splitter and to the detector 340 or being directed toward the reflector 330. FIG. 3 also includes a filter 390 for filtering out one or more wavelengths of radiation.

In the example of FIG. 3, 1.5 um is filtered which, in this example, is the wavelength that the image converter is generating short wavelength radiation. In this manner, the system can have a clean signal from the image converter 350 at that wavelength that can be received by the detector 340.

Figure 4:
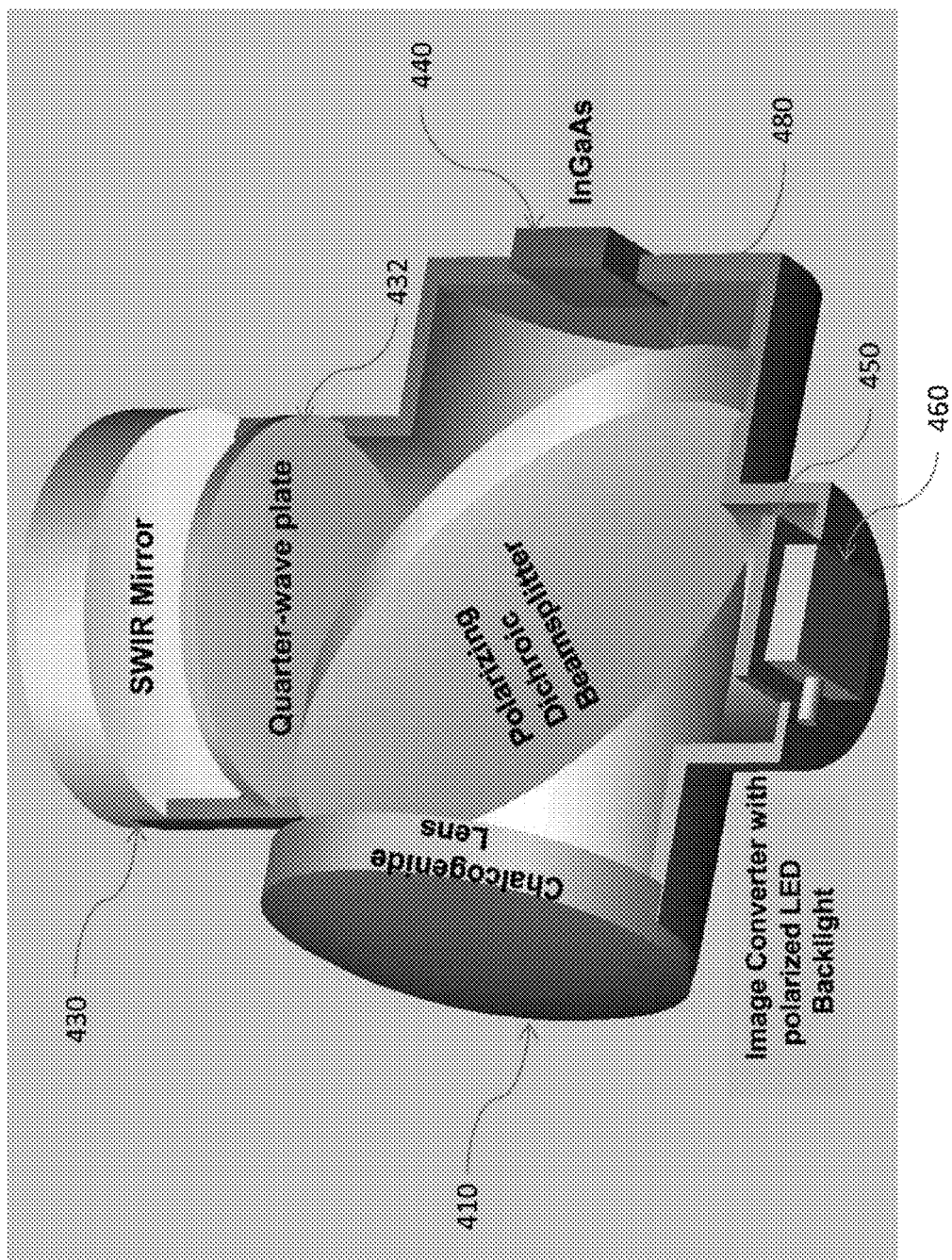
FIG. 4 illustrates a cutaway view of another dual band imager system embodiment of the present disclosure.

FIG. 4 illustrates a cutaway view of another dual band imager system embodiment of the present disclosure. The example embodiment illustrated in FIG. 4, includes an image converter 450 that utilizes a polarized backlight 460 and a polarizing beam splitter 480 that receives light from lens 410. This embodiment also uses a quarter wave plate 432 positioned by the reflector 430 which ensures that nearly 100% of the 1.5 um backlight is transmitted through the beam splitter 480 and then reflected on the second pass to the detector 440 thus enabling a lower backlight power and eliminating the need for the filter (390 of FIG. 3) because of no 1.5 um reflection off the beam splitter.

With respect generally to the embodiments of the present disclosure, imagers that have dual band performance can provide added benefits over single band imagers. This can be because events that occur at different temperatures and speed can have different spectral content. When observed in more than one band, it becomes easier to detect and/or discriminate between a range of events.

One scenario where dual band operation is desirable is in distinguishing and/or locating muzzle flashes in a background of normal thermal radiation. Thermal radiation emissions are mostly in the 8-12 um LWIR band and, because of the low 300K temperature, little radiation occurs in the SWIR bands. On the other hand, muzzle flashes from weapons, are typically short, bright, hot, and have significant intensity at shorter wavelengths and in particular in SWIR bands. These flashes are small in extent, however, and can be lost in the overall thermal LWIR information.

In some embodiments, a camera has dual band LWIR-SWIR performance that can take advantage of the dual band imager. Unlike other dual-band technologies, dual band imager does not require any additional detector array for the added band. Also because, the same detector is used for sensing in both bands, the images may overlap at the detector. This is different from other approaches where 2 detectors are used and the images have to be registered to each other.

The advantages of dual band imager over these types of combined SWIR-LWIR mosaic arrays are twofold. First, the LWIR technology is more manufacturable not requiring the combination of MEMS, CMOS, and semiconductor crystal growth on the same chip. Secondly, the dual band imager array has every pixel detecting in-band and does not compromise imaging by dividing the real estate between LWIR and SWIR pixels. Because the LWIR readout of dual band imager already occurs in the SWIR bands with an InGaAs (Ge-CMOS) array, the dual band detection can be achieved by modifying the optical system and readout to include direct imaging of target SWIR radiation.

Figure 5:
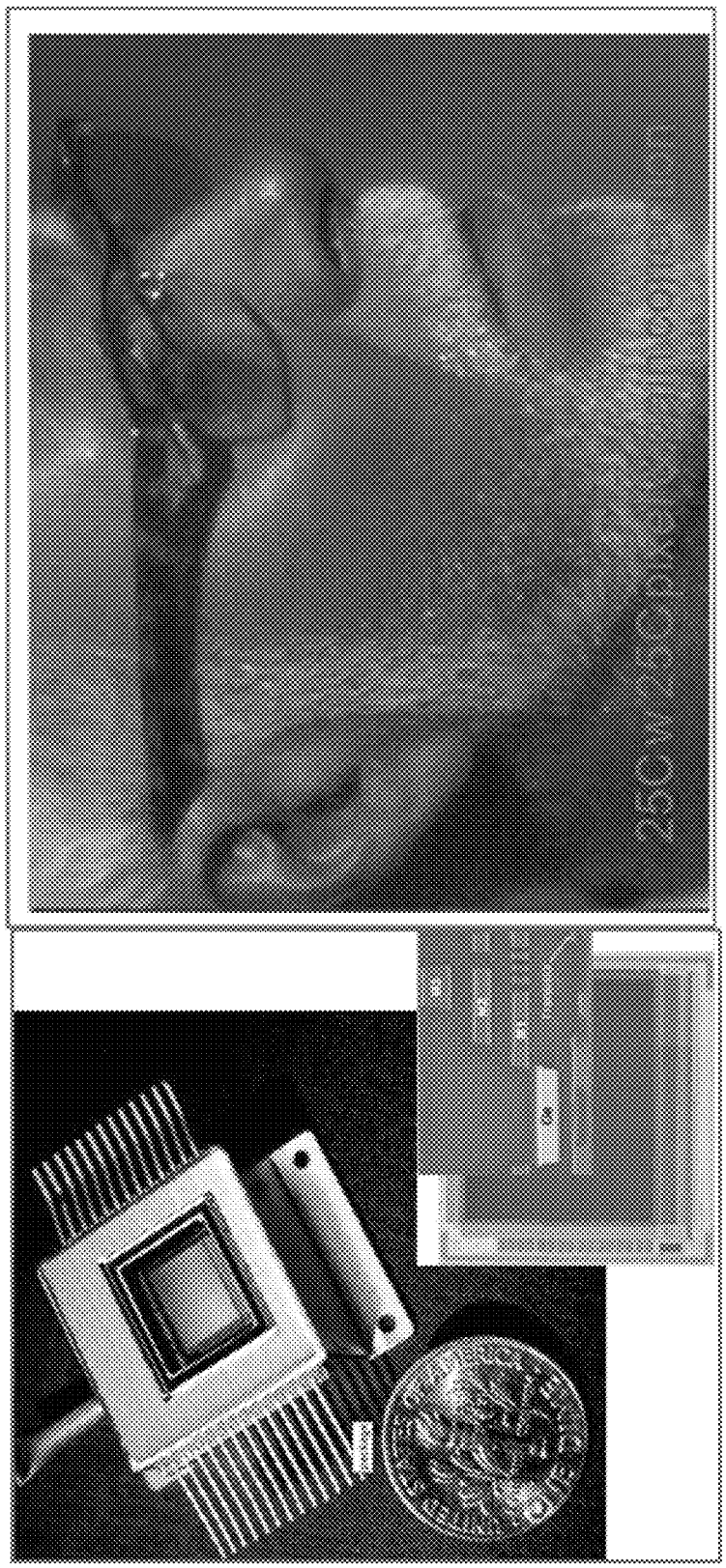
FIG. 5 illustrates a potential size of a CMOS array that can be utilized in one or more embodiments of the present disclosure and illustrates an un-manipulated image on the right side of the figure.

FIG. 5 illustrates a potential size of a CMOS array that can be utilized in one or more embodiments of the present disclosure and illustrates an un-manipulated image on the right side of the figure. As can be seen by the example of FIG. 5, a CMOS array can be designed to be very small allowing for such devices to have a small form factor which can be beneficial in some applications. The example illustrated is a 640×480 10 um pitch Ge-CMOS array. FIG. 5 also illustrates the clarity of an image that can be obtained based on one embodiment of the present disclosure.

In some embodiments, the dual band imager observes SWIR and LWIR by toggling between the two readout modes, for example at 30 or 60 Hz frame rates. In the SWIR detection mode, the LED can be turned off and no light from the image converter element reaches the InGaAs detector.

In the SWIR detection mode, light from both the scene and the image converter LED reaches the InGaAs detector. Since the image converter LED light is designed to be much brighter than the scene radiation, in most cases, the scene signal will be a small noise factor on the LWIR signal.

To further minimize this effect, subtracting the prior frame pure SWIR scene component from the total LWIR+SWIR signal of the next frame can produce a more accurate LWIR image on the InGaAs detector. It is also possible to totally eliminate the SWIR scene component from the LWIR signal by placing a SWIR rejection filter in front of the collecting lens but this method is may only be applicable in a non-toggling condition where extended imagery is taken in either LWIR mode.

In most applications, the LWIR can be used for observation with wide field of view (FOV) optics and the SWIR band can be used for target detection with a narrow FOV optical system. Locating a chalcogenide zoom lens on the system can permit operation in multiple other modes (e.g., 4 modes: wide FOV LWIR and SWIR for observation and narrow FOV SWIR and LWIR for characterization). The most utilized modes may be wide FOV LWIR-SWIR and narrow FOV SWIR.

Figure 6:
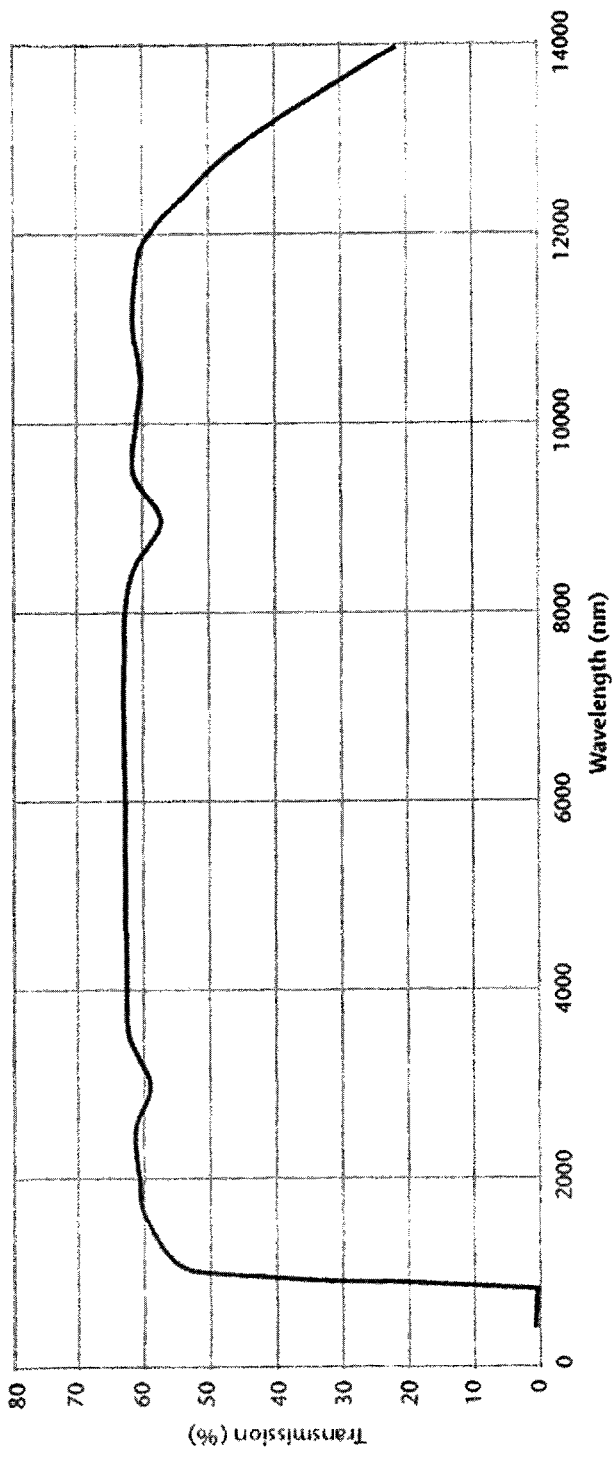
FIG. 6 illustrates a transmission curve of a lens material illustrating high transmission for both short wavelengths and long wavelengths making such a material suitable for use with one or more embodiments of the present disclosure.

In some embodiments, the front collecting optical elements can be arranged to transmit radiation over both the LWIR and SWIR spectra. For example, chalcogenide material has this capability. FIG. 6 illustrates a transmission curve of a lens material illustrating high transmission for both short wavelengths and long wavelengths making such a material suitable for use with one or more embodiments of the present disclosure.

In the example embodiment of FIG. 6, a Schott material is used. As can be seen from the chart, Schott material such as IG6 has good optical transmission that extends from 1 um to over 12 um. Moreover, this material can be molded and so it can be made in high volume at much lower cost than diamond-turned IR optics. Although this material may have advantages in some applications, other suitable materials may be used in various embodiments.

Figure 7:
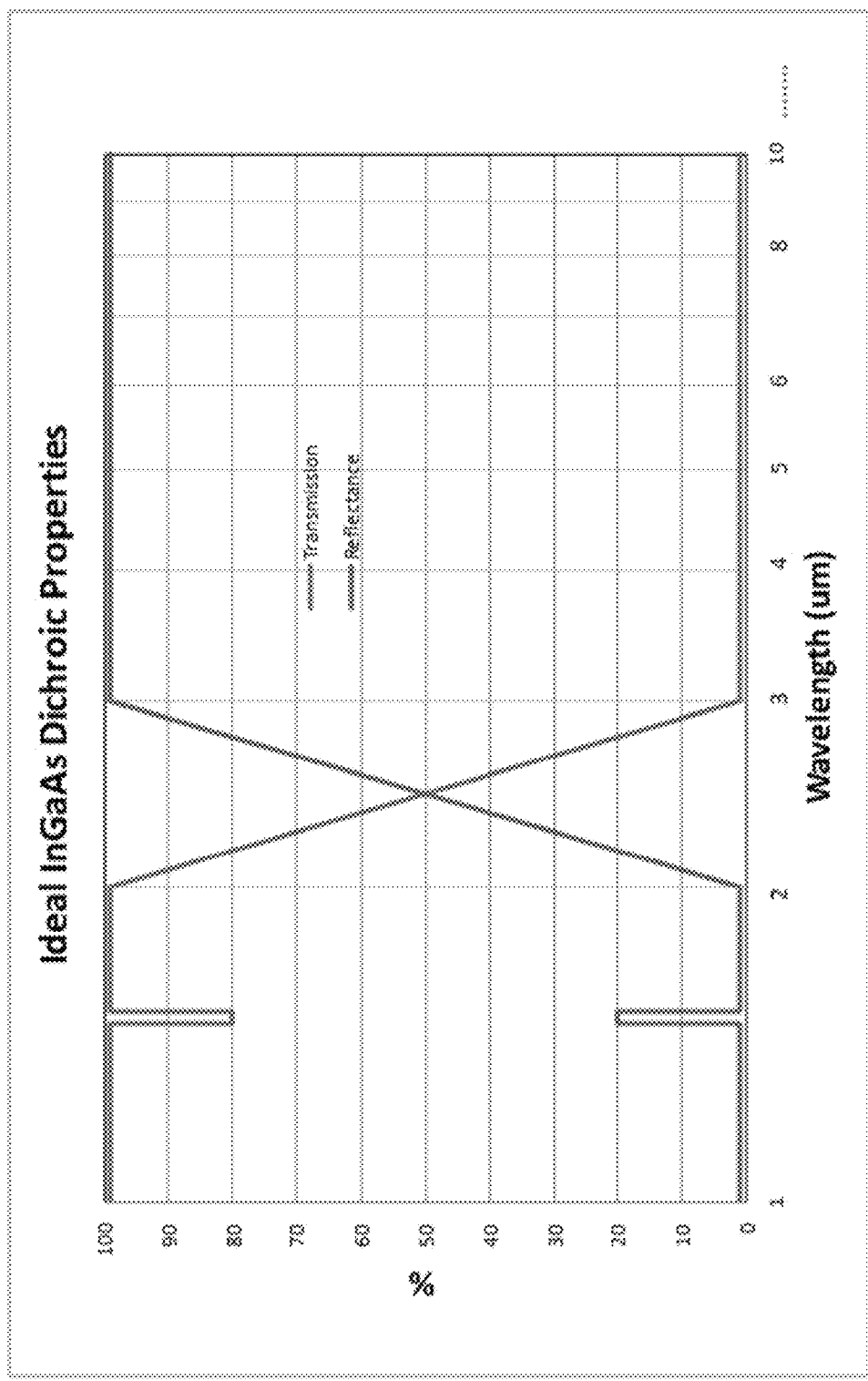
FIG. 7 illustrates the ideal properties of a dichroic beam splitter that is suitable for use with one or more embodiments of the present disclosure.

FIG. 7 illustrates the ideal properties of a dichroic beam splitter that is suitable for use with one or more embodiments of the present disclosure. In this example, all of the LWIR radiation is reflected. All of the SWIR radiation is transmitted except for a narrow band (e.g., 40 nm) for the LED radiation. In a configuration similar to that of FIGS. 1 and 2, a LED backlight on the InGaAs detector is approximately 16% (e.g., 80%×20%). With the polarization design of FIGS. 6, the LED transmission can be comparable to the rest of the SWIR bandwidth. In such a case the polarized LED backlight can be nearly or totally transmitted and then nearly or totally reflected on the second pass of the beam splitter because of the effect of quarter wave plate.

Figure 8:
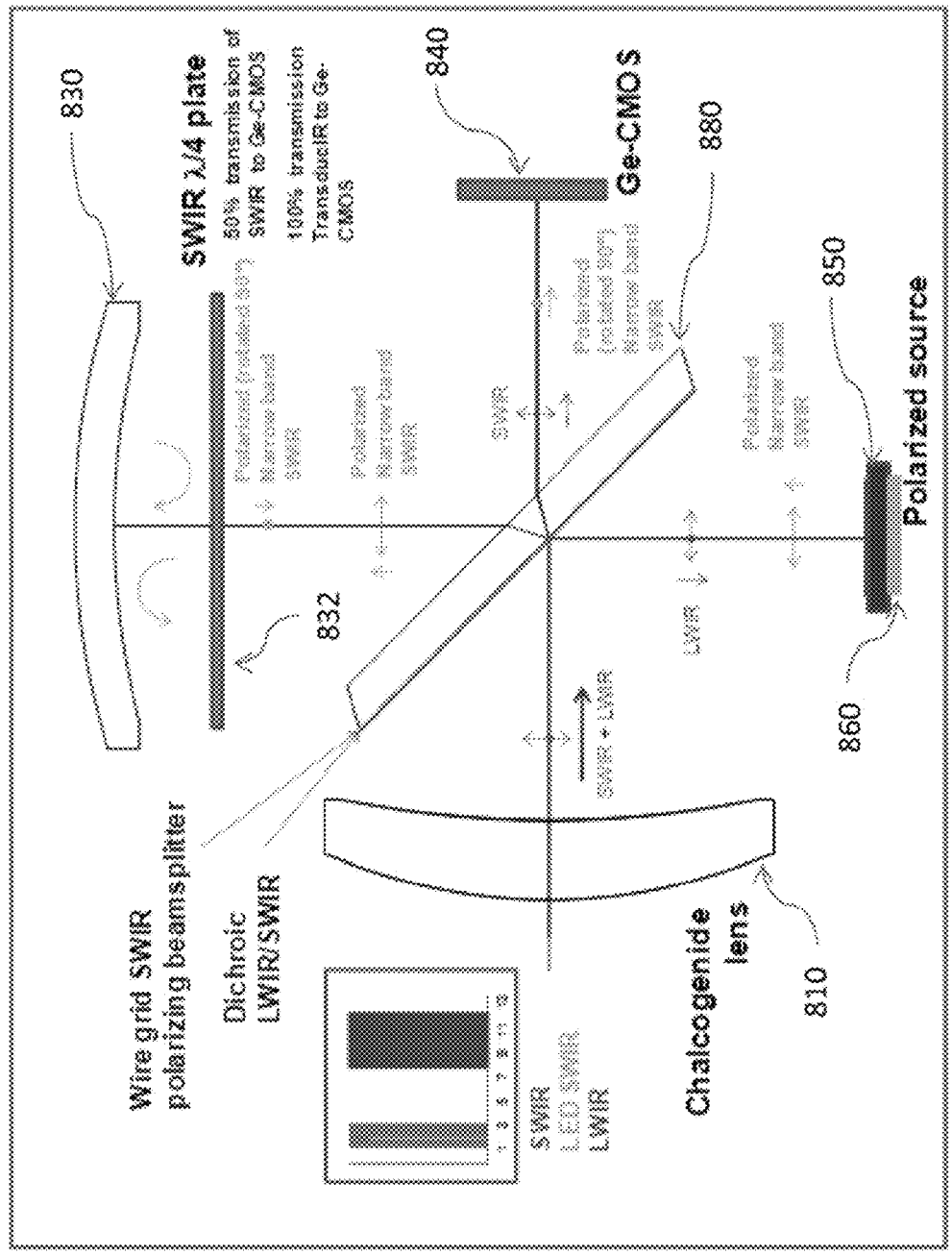
FIG. 8 illustrates an optical tracing path of another embodiment of the present disclosure.

As discussed herein, there are a number of optical means to achieve dual band detection with the dual band imager. FIG. 8 illustrates an optical tracing path of another embodiment of the present disclosure. The embodiment of FIG. 8 is similar to that provided in FIG. 4. In this embodiment, the system includes a chalcogenide lens 810, a polarized beam splitter 880, a quarter wave plate 832, a reflector 830, an image converter 850, a polarized backlight source 860, and a detector 840. In some embodiments, such as the system shown in FIG. 8, a polarizing dichroic beam splitter whose spectral properties are roughly shown in FIG. 7 can be utilized. As shown in FIG. 8, in some embodiments, the polarized beam splitter can be provided by a wire grid polarizing beam splitter.

Figure 9:
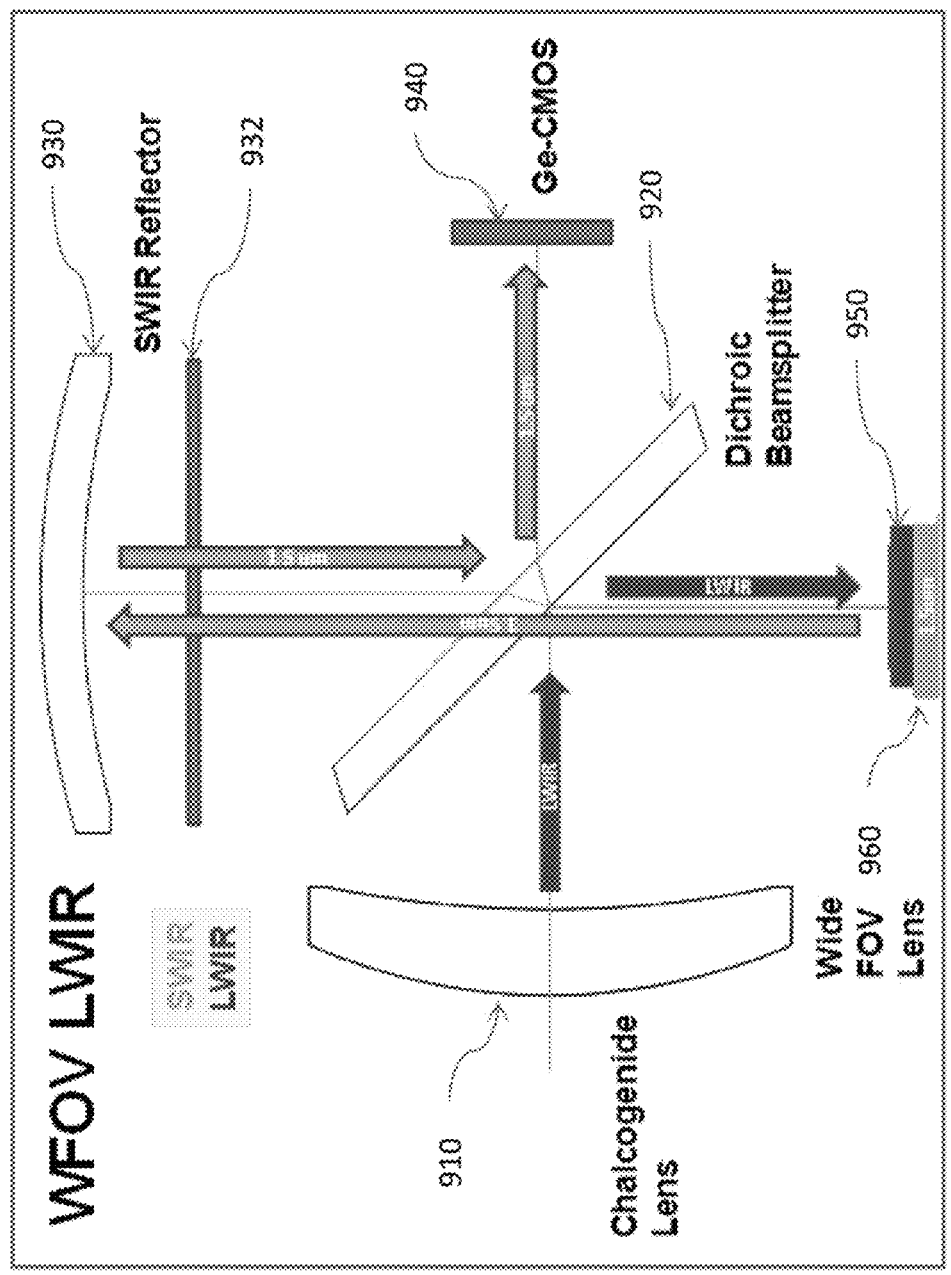
FIG. 9 illustrates the propagation of long wavelength light through an embodiment of the present disclosure.
Figure 10:
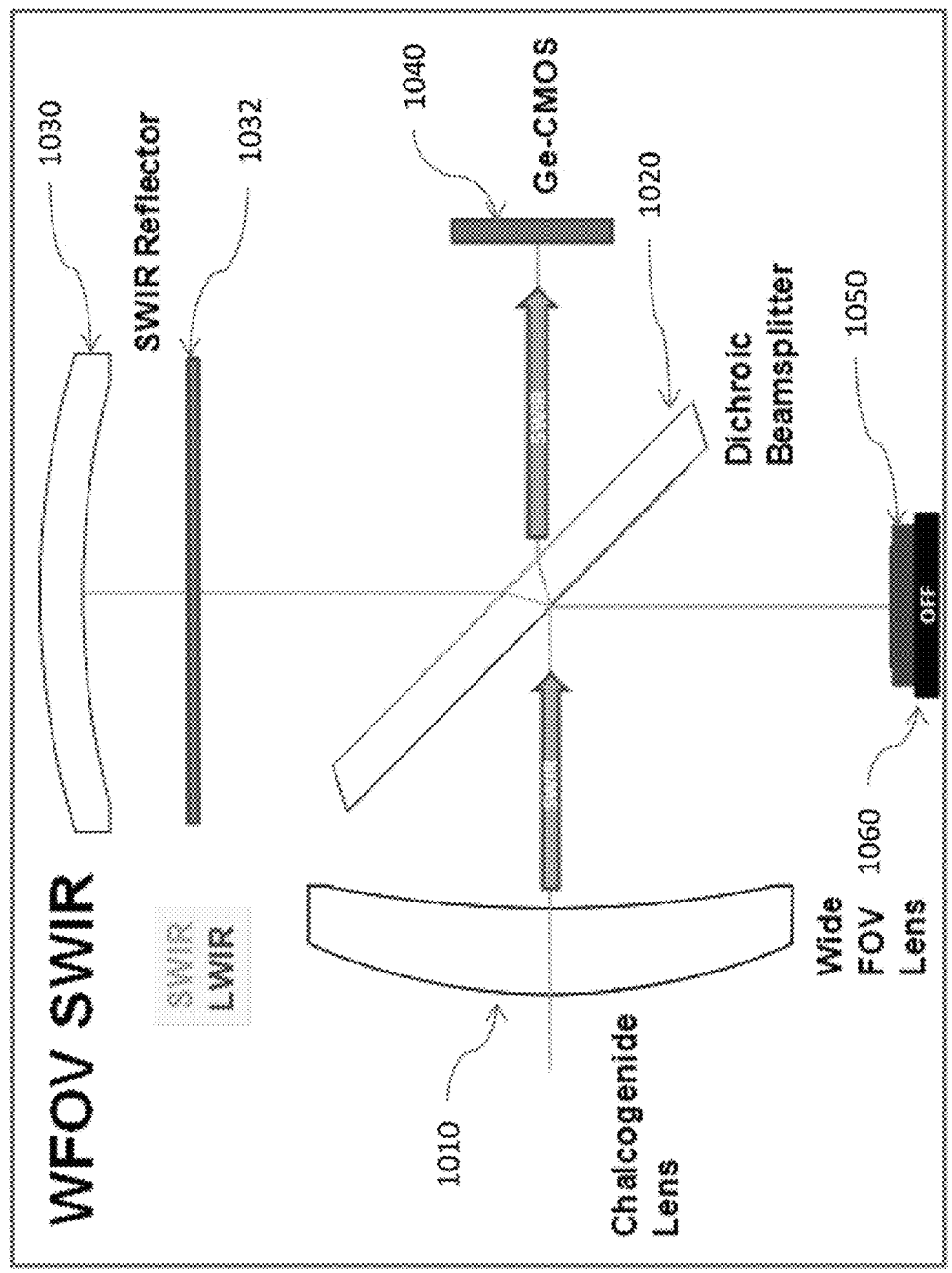
FIG. 10 illustrates the propagation of short wavelength light through an embodiment of the present disclosure.

FIG. 9 illustrates the propagation of long wavelength light through an embodiment of the present disclosure. FIG. 10 illustrates the propagation of short wavelength light through an embodiment of the present disclosure. FIGS. 9 and 10 include the same system components since they are illustrating a system with the backlight turned on and off. In these embodiments, the system includes a chalcogenide lens 910/1010, a dichroic beam splitter 920/1020, a quarter wave plate 932/1032, a reflector 930/1030, an image converter 950/1050, a backlight 960/1060, and a detector 940/1040.

FIGS. 9 and 10 illustrate the radiation paths for LWIR detection and direct SWIR detection respectively. In such embodiments, radiation from a scene can be imaged directly onto the InGaAs (e.g., a Ge-CMOS) detector through a dichroic beam splitter that transmits the SWIR radiation.

LWIR radiation from a scene is imaged onto the dual band imager element by reflecting off of the dichroic beam splitter. This radiation can be nearly totally absorbed by the pixels that contain a VO2 element whose SWIR transmission decreases in response to the pixel temperature rise. This change in pixel transmission (for example, at 1.5 um wavelengths) can be detected by the InGaAs (Ge-CMOS) array producing an image of the LWIR scene.

The dual band imager readout radiation is produced by a narrow band backlight from a 1.5 um LED. This process is much the same as that achieved on backlit LCD flat panel displays except for the wavelength and that the light is polarized by a small grating printed on the dual band imager substrate.

The intensity of this light is modified by the VO2 transmission change of the dual band imager pixels caused by LWIR heating. The polarized light is transmitted through the polarizing beam splitter to the reflector and back.

A quarter wave plate, located in the beam, can be used to rotate the light polarization and cause it to reflect off the beam splitter grating on the second pass and be imaged onto the Ge-CMOS array. One advantage of this approach is that 100% of the polarized readout backlight light reaches the detector array. An alternate approach that does not use the polarized beam splitter and quarter wave plate but a 50% SWIR beam splitter would still only transmit 50% of the direct scene radiation to the Ge-CMOS detector as with this design but would only allow 25% of the dual band imager readout light to reach the Ge-CMOS detector.

FIG. 9 shows the standard LWIR imaging mode where LWIR radiation is focused onto the dual band imager element and readout is achieved by the InGaAs (Ge-CMOS) detecting changes in the transmitted LED backlight. The direct SWIR radiation is usually weak relative to the strong backlight which is operated in a mode that nearly fills the InGaAs (Ge-CMOS) wells.

At worst case, the raw SWIR signal generates a small noise signal but it is typically miniscule compared to the intensity of the backlight. In the direct SWIR detection mode, the backlight can be off and no 1.5 um signal reaches the InGaAs (Ge-CMOS) detector array. Alternately, the SWIR signal of one frame can be subtracted from the SWIR+LWIR signal of a subsequent next frame to produce a more accurate LWIR image. Another benefit of the embodiments of the present disclosure is that the dual band detector embodiments do not involve any moving parts to detect radiation in either of the 2 bands using the same InGaAs (Ge-CMOS) array.

Figure 11:
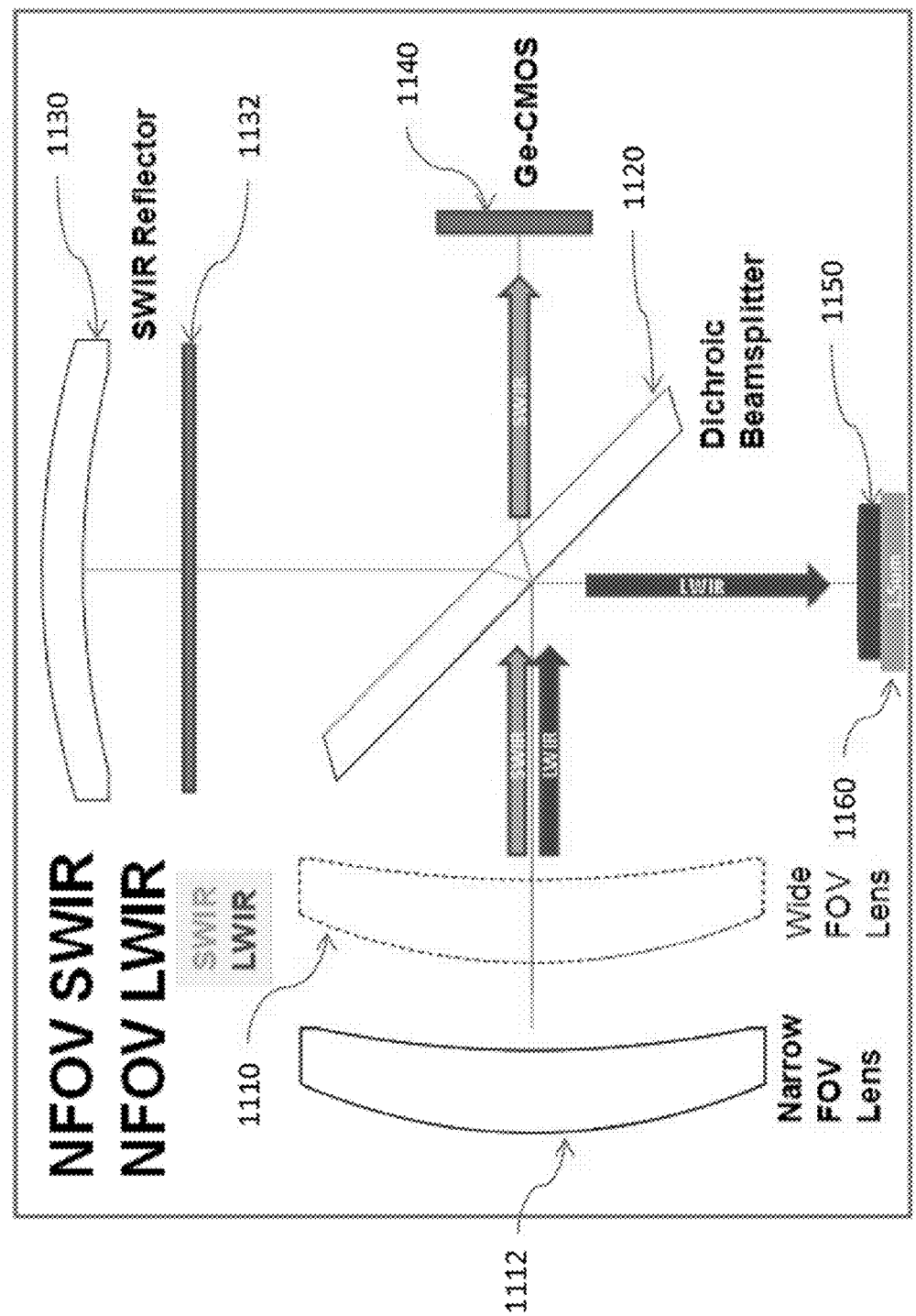
FIG. 11 illustrates an optical tracing path of another embodiment of the present disclosure.

One dual band imager concept discussed herein has focused on achieving wide field of view imagery in both SWIR and LWIR bands. It is also desirable to have a high magnification narrow field of view mode for enhanced targeting and characterization as illustrated by the embodiment of FIG. 11. FIG. 11 illustrates an optical tracing path of another embodiment of the present disclosure.

In this embodiment, the system includes a lens 1110, a dichroic beam splitter 1120, a quarter wave plate 1132, a reflector 1130, an image converter 1150, a backlight 1160, and a detector 1140. In normal operation the camera would be capable to toggle back and forth between the modes of FIGS. 9 and 10 and could thereby display alternating SWIR and LWIR scenes at, for example 30 Hz frame rates, with a wide field of view. Once a target is observed, a zoom lens on the camera can be utilized to magnify the identified region with a narrower field of view (e.g., moved from position 1110 to position 1112) for higher resolution target identification.

In this mode, shown in FIG. 11, both the direct SWIR and the LWIR radiation are still imaged on the detector and the dual band imager element respectively and the dual band imager readout occurs with an unchanged geometry. In zoom mode, both functionalities are still maintained.

Figure 12:
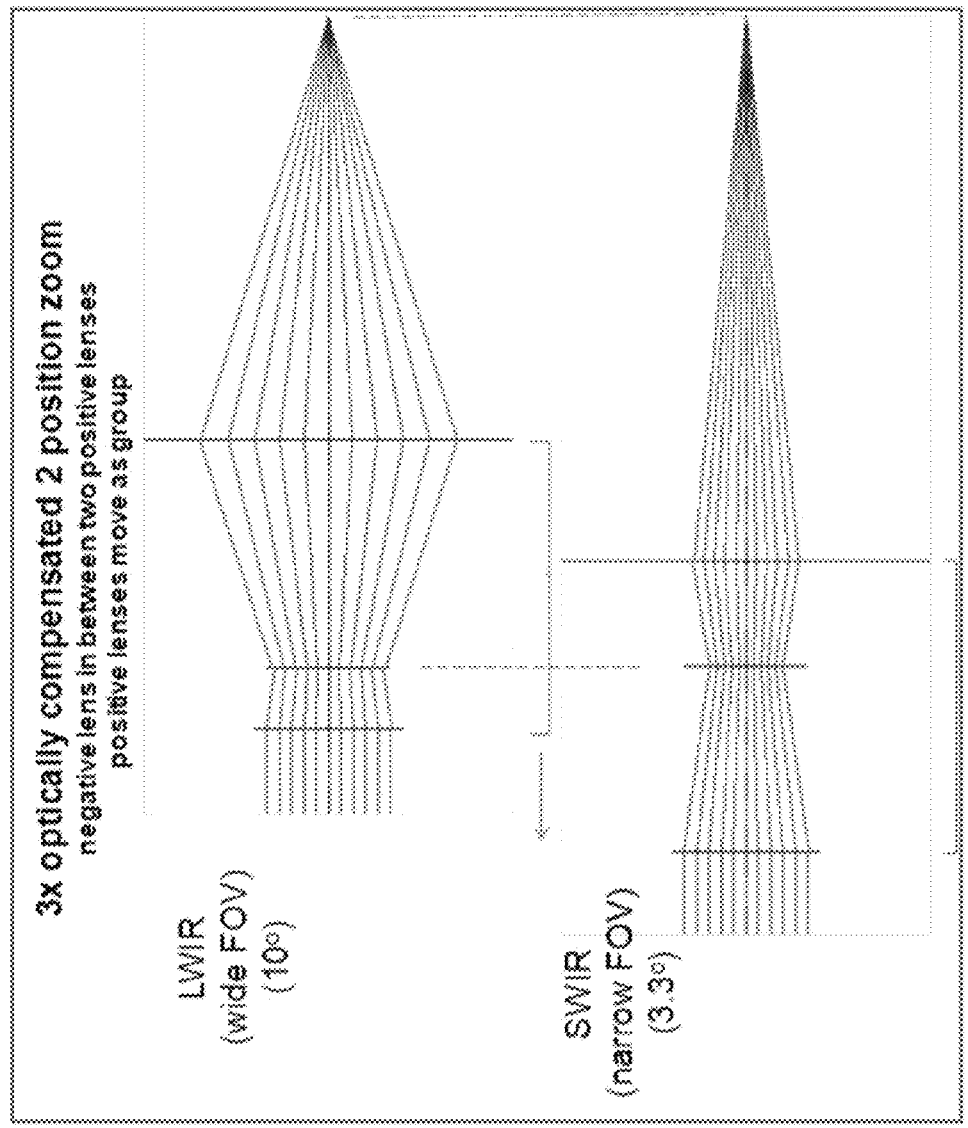
FIG. 12 illustrates an optical tracing path of zoom lenses that are suitable for use with one or more embodiments of the present disclosure.

FIG. 12 illustrates an optical tracing path of zoom lenses that are suitable for use with one or more embodiments of the present disclosure. FIG. 12 shows a ray tracing of one example of a three element zoom lens with a fixed central lens and movable positive lenses that maintain imaging onto the fixed detector and dual band imager elements. In modes where the signal is only LWIR and the camera is momentarily operated in only a single band, it could be desirable, in some embodiments, to locate a SWIR filter in front of the system to reject the SWIR scene radiation so that only LWIR scene radiation is detected.

Since the dual mode detector uses the InGaAs (Ge-CMOS) for both LWIR and SWIR detection, it would not be possible to observe both images at the same time, with such an embodiment. On the other hand, the dual band imager element can store the LWIR image on its pixels and only when the SWIR backlight illuminates the dual band imager will this image be readout onto the InGaAs (Ge-CMOS). The rest of the time the InGaAs (Ge-CMOS) can be observing only the low level raw SWIR radiation from the scene.

One proposed timing diagram is shown below in FIG. 12 but there may be many options depending on the readout designs in the CMOS and dual band imager arrays. In the first half of the timing frame, the InGaAs can record a SWIR image directly from the scene as imaged through the chalcogenide optics. At the same time, the dual band imager element is collecting the LWIR information by virtue of the radiation heating the VO2 window elements in the array pixels.

At the second half of the frame time, the backlight is pulsed on and transmitted through the dual band imager pixel VO2 material as depicted in FIG. 10. The transmission of each pixel and intensity at the InGaAs (Ge-CMOS) detector is defined by how much heating has occurred from the LWIR radiation. This transmitted backlight is sent through the beam splitter, reflecting optics, and then reflected off the beam splitter to be collected on the InGaAs (Ge-CMOS).

In the second half of the duty cycle, the InGaAs records the image (e.g., 1.5 um intensity image) that has been generated by the effect of the LWIR radiation on the dual band imager elements.

Figure 13:
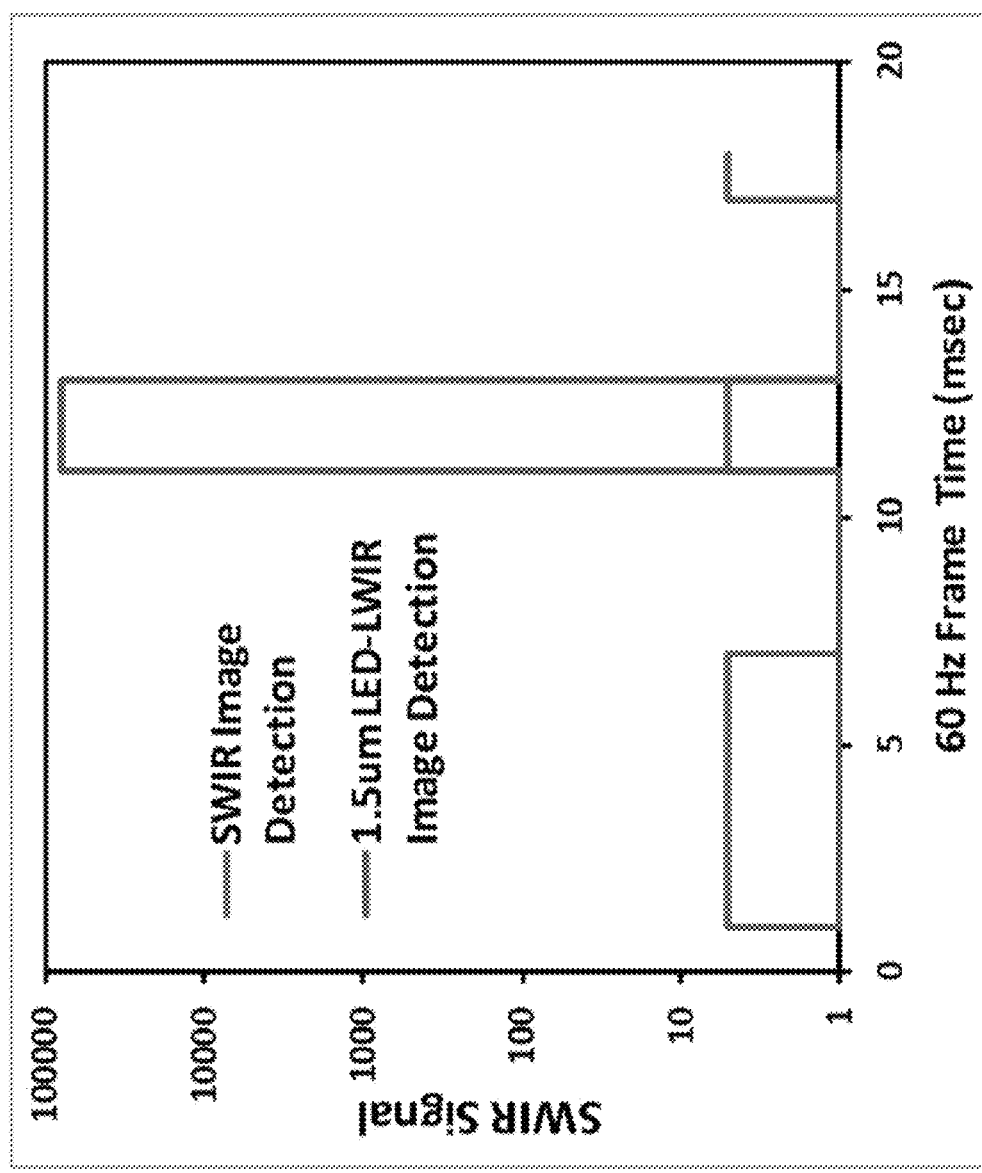
FIG. 13 illustrates an InGaAs readout frame timing permitting the recording of direct short wavelength and long wavelength images with the same detector array according to one or more embodiments of the present disclosure.

FIG. 13 illustrates an InGaAs readout frame timing permitting the recording of direct short wavelength and long wavelength images with the same detector array according to one or more embodiments of the present disclosure. Readout of dual band imager with the backlight is achieved using the same detector but at high light levels. High light levels are utilized to achieve high S/N on the CMOS in order to distinguish between small decreases in the transmission of the backlit image converter pixels as they are heated by LWIR radiation. The true LWIR image can be obtained by subtracting of the small SWIR image if it is too strong in the region where bright SWIR sources, such as lighting, occurs. In the example if FIG. 13, the chart illustrates an InGaAs detector readout frame timing permitting the recording of direct (1-2 um) SWIR and 1.5 um LED-LWIR images with the same detector array.

In some embodiments, the dual band imager uses a thin film (e.g., VO2 thin film) that has a sharp near ambient transition with large change in optical transmission. Thin VO2 films may be grown on oriented TiO2 buffer films to obtain a film with such a transition.

Integrating this film into a thermally sensitive MEMS structure may be done using a MEMS structure that is heated into the transition region for maximum opto-thermal sensitivity. The array may also be enclosed in a vacuum package for maximum thermal sensitivity.

Low cost wafer-level packaging technology can readily be applied to manufacture the dual band imager embodiments of the present disclosure. Various types of LEDs may be suitable LEDs for backlighting the array. The detector in one embodiment is a 10 um pitch Ge-CMOS.

It has been demonstrated that room temperature imaging with GE-CMOS can be achieved. Cooling the array with TE coolers, whether it be Ge-CMOS or InGaAs, will have benefits but it is felt that the array can also operate without cooling. In some embodiments, the optical system includes a dual band chalcogenide lens, SWIR reflector, and a dichroic polarizing beam splitter as discussed above.

In some embodiments, where the detector may be used in a LWIR mode in conditions that contain significant amounts of SWIR, such as twilight, or other conditions, a short wavelength filter may be inserted in the optical path. For example, a flip down lens or other mechanism may be used to provide such a filter.

Figure 14:
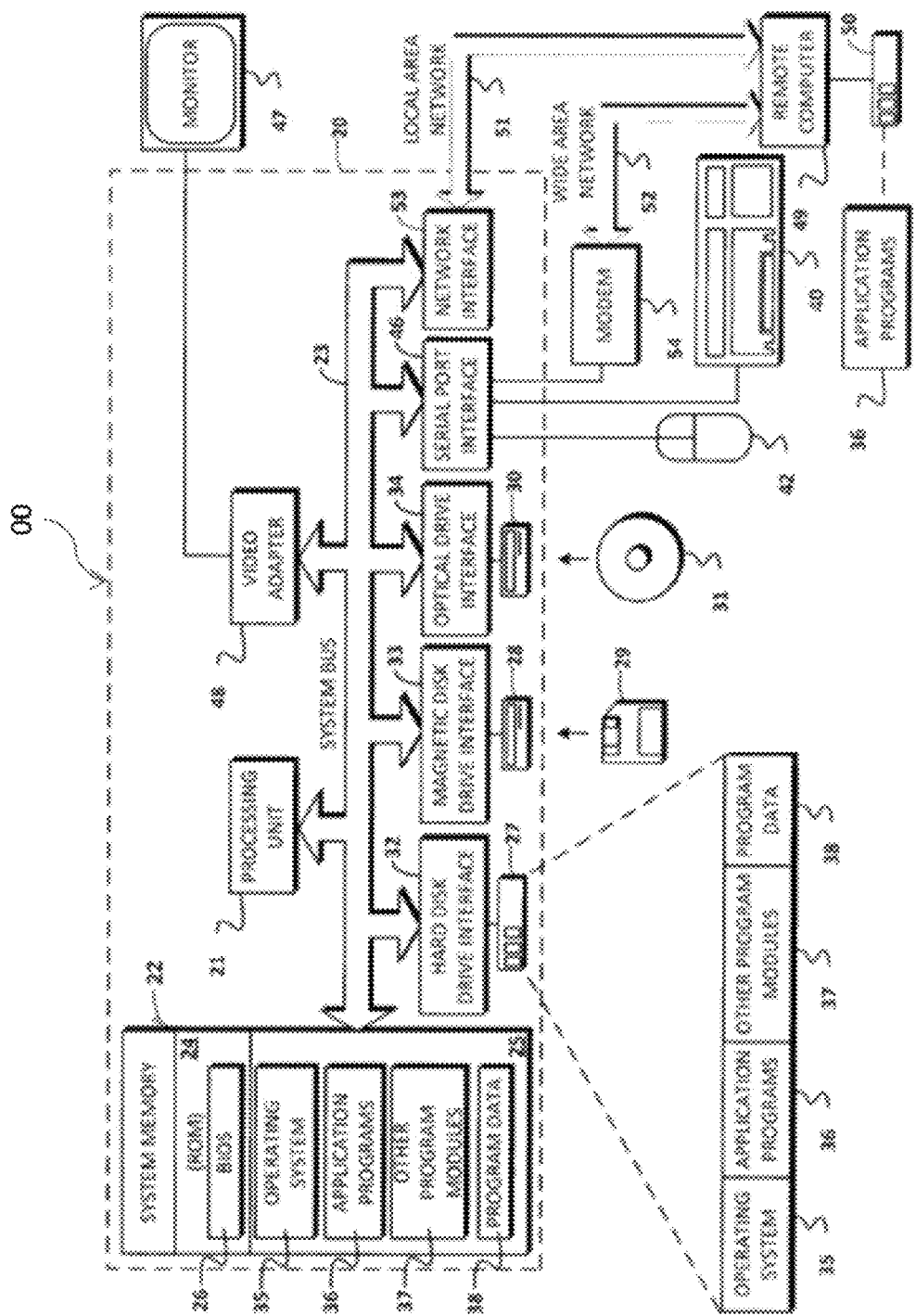
FIG. 14 illustrates a computing device that can be utilized with one or more of the embodiments of the present disclosure.

FIG. 14 illustrates a computing device that can be utilized with one or more of the embodiments of the present disclosure. FIG. 14 is a block diagram of a computer system to implement methods according to an example embodiment. In the embodiment shown in FIG. 14, a hardware and operating environment is provided that may be used to control the modes of IR detection as well as provide visible displays of images obtained by the dual band infrared imager in various embodiments of the present disclosure. While many components are shown below, many of the components may not be needed, and the resulting system may be much simplified in further embodiments.

The functions or algorithms described herein may be implemented in software or a combination of software and human implemented procedures together in one embodiment. The software may include computer executable instructions stored on computer readable media such as memory or other type of storage devices.

Further, such functions correspond to modules, which are software stored on storage devices, hardware, firmware, or any combination thereof. Multiple functions may be performed in one or more modules as desired, and the embodiments described are herein should be viewed merely as examples. The software may be executed on a digital signal processor, ASIC, microprocessor, or other type of processor operating on a computer system, such as a personal computer, server, or other computer system.

As shown in FIG. 14, one embodiment of the hardware and operating environment includes a general purpose computing device in the form of a computer 00 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 00 comprises a single central-processing unit (CPU), or a plurality of processing units, commonly referred to as a multiprocessor or parallel-processor environment. In various embodiments, computer 00 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 00, such as during start-up, may be stored in ROM 24. The computer 00 further includes a hard disk drive and/or flash memory drive 27 for reading from and writing to the drive, not shown, a magnetic disk drive 28 for reading from or writing to a removable magnetic disk 29, and an optical disk drive 30 for reading from or writing to a removable optical disk 31 such as a CD ROM or other optical media.

The drive 27, magnetic disk drive 28, and optical disk drive 30 couple with a hard disk and/or flash drive interface(s) 32, a magnetic disk drive interface 33, and an optical disk drive interface 34, respectively. The drives and their associated computer-readable media provide non-volatile storage of computer-readable instructions, data structures, program modules and other data for the computer 00. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or method described herein may be resident on any one or number of these computer-readable media.

A user may enter commands and information into computer 00 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB).

A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 00 may operate in a networked environment using logical connections to one or more remote computers or servers, such as remote computer 49. These logical connections are achieved by a communication device coupled to or a part of the computer 00; the embodiments of the present disclosure are not limited to a particular type of communications device.

The remote computer 49 can be another computer, a server, a router, a network PC, a client, a peer device or other common network node, and typically includes many or all of the elements described above I/O relative to the computer 00, although only a memory storage device 50 has been illustrated. The logical connections depicted in FIG. 14 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 00 can be connected to the LAN 51, for example, through a network interface or adapter 53, which is one type of communications device. In some embodiments, when used in a WAN-networking environment, the computer 00 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46.

In a networked environment, program modules depicted relative to the computer 00 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following statements are potential claims that may be converted to claims in a future application. No modification of the following statements should be allowed to affect the interpretation of claims which may be drafted when this provisional application is converted into a regular utility application.

The invention claimed is:

1. a dual band imager, comprising:
   an optical element to receive a first wavelength range and a second wavelength range of radiation from a scene to be imaged;
   a beam splitter positioned to receive the radiation from the optical element and to direct the first wavelength range and the second wavelength range radiation in different directions;
   an image converter positioned to receive the first wavelength range radiation from the beam splitter and to transmit the image information via converted radiation in the second wavelength range; and
   the image converter comprises a vanadium dioxide (VO2) pixel array and the backlight comprises a light emitting diode positioned to direct light toward the beam splitter through the VO2 pixel array; and
   a detector positioned perpendicularly relative to the position of the image converter to receive the converted radiation in the second wavelength range containing the image information through the beam splitter and from the image converter, second wavelength range radiation from the scene, or a combination of the two.

2. The imager of claim 1, further comprising a reflector positioned to reflect the transmitted short wavelength radiation from the converter such that it is imaged by the detector.

3. The imager of claim 1, wherein the first wavelength range is a medium or long wavelength range and the second wavelength range is a short wavelength range.

4. The imager of claim 1, wherein the detector is an InGaAs-complementary metal-oxide semiconductor detector and wherein the radiation is infrared radiation.

5. The imager of claim 1, further comprising a controller to control the backlight to turn on the backlight to cause detection of long wavelength radiation and to turn off the backlight to cause detection of short wavelength radiation.

6. The imager of claim 1, wherein the optical element comprises a chalcogenide glass lens.

7. The imager of claim 1, wherein the optical element comprises a zoom lens.

8. A dual band radiation imager, comprising:
   an optical element to receive short wavelength and long wavelength radiation from a scene to be imaged;
   a polarizing beam splitter positioned to receive the radiation from the lens;
   an image converter positioned to receive long wavelength radiation from the beam splitter and to modulate light from a polarized backlight; and
   the image converter comprises a vanadium dioxide (VO2) pixel array and the backlight comprises a light emitting diode positioned to direct light toward the beam splitter through the VO2 pixel array; and
   a detector to receive short wavelength radiation via the beam splitter from the scene and from the image converter.

9. The imager of claim 8, wherein the beam splitter is a dichroic beam splitter.

10. The imager of claim 8, further comprising a controller to control a backlight to turn on the backlight to cause detection of long wavelength radiation and to turn off the backlight to cause detection of short wavelength radiation.

11. The imager of claim 8, wherein the beam splitter is a polarized beam splitter.

12. The imager of claim 11, further comprising a polarized backlight source positioned to direct radiation toward the beam splitter.

13. The imager of claim 8, wherein the long wavelength radiation is classified as medium wavelength radiation.

14. A method, comprising:
    receiving short wavelength radiation;
    projecting the short wavelength radiation onto a short wavelength radiation detector to provide an image based on the received short wavelength radiation;
    receiving long wavelength radiation;
    converting the received long wavelength radiation into converted short wavelength radiation using an image converter positioned perpendicularly relative to the short wavelength radiation detector; and
    the image converter comprises a vanadium dioxide (VO2) pixel array and the backlight comprises a light emitting diode positioned to direct light toward the beam splitter through the VO2 pixel array; and
    projecting the converted short wavelength radiation onto the short wavelength radiation detector to provide an image based on the received long wavelength radiation.

15. The method of claim 14, and further comprising using a polarizing beam splitter to project the radiation onto the detector.

16. The method of claim 15, wherein the radiation is infrared radiation and wherein the image converter comprises a vanadium dioxide (VO2) detector and a polarized backlight, and wherein the converted short wavelength light is projected through the polarizing beam splitter and a quarter wavelength plate, and reflected back to the beam splitter before being projected onto the detector.

17. The method of claim 14, and further comprising:
    turning on a backlight of the image converter to cause the detector to provide the image based on the received long wavelength radiation; and turning off the backlight of the image converter to cause the detector to provide the image based on the received short wavelength radiation.

18. The method of claim 17, and further comprising using a zoom lens to receive the radiation.

* * * * *